United States Patent [19]

Karube

[11] Patent Number: 4,866,238
[45] Date of Patent: Sep. 12, 1989

[54] GAS LASER DEVICE

[75] Inventor: Norio Karube, Machida, Japan

[73] Assignee: Fanuc Ltd., Minamitsuru, Japan

[21] Appl. No.: 196,218

[22] PCT Filed: Aug. 26, 1987

[86] PCT No.: PCT/JP87/00633
§ 371 Date: Mar. 28, 1988
§ 102(e) Date: Mar. 28, 1988

[87] PCT Pub. No.: WO88/01552
PCT Pub. Date: Mar. 10, 1988

[30] Foreign Application Priority Data

Sep. 4, 1986 [JP] Japan .................. 61-208491

[51] Int. Cl.⁴ ............................................ B23K 26/08
[52] U.S. Cl. .................. 219/121.78; 219/121.74; 219/121.84
[58] Field of Search .............. 219/121.78, 121.74, 219/121.67, 121.6, 121.85, 121.63, 121.64, 121.84; 372/58, 59

[56] References Cited

U.S. PATENT DOCUMENTS 4,547,885 10/1985 Allen et al. .................. 372/58
4,626,999 12/1986 Bannister .................. 219/121.67 X
4,675,501 6/1987 Klingel .................. 219/121.67
4,694,139 9/1987 Röder .................. 219/121.74 X

FOREIGN PATENT DOCUMENTS 2741737 3/1979 Fed. Rep. of Germany .................. 219/121.67

*Primary Examiner*—C. L. Albritton
*Attorney, Agent, or Firm*—Staas & Halsey

[57] ABSTRACT

A gas laser device in which a laser medium gas is circulated in an airtight container and a laser beam is generated from the gas excited by an electric discharge, includes a main unit (10) including an air blower and a heat exchanger for circulating and cooling the gas, and a discharging power supply. A laser beam emitter includes a resonator (2). The main unit and the laser beam emitter are separate from each other, with the laser beam emitter being mounted on the tip end of a robot (1). The resonator (2) includes a lateral multimode resonator, and the discharging power supply includes a high-frequency power supply. A gas flow in the resonator (2) is produced by using a compressor having a high compression ratio.

16 Claims, 2 Drawing Sheets

GAS LASER DEVICE

BACKGROUND OF THE INVENTION

1. Field of the Invention

The present invention relates to a gas laser device, and more particularly, to a gas laser device which can produce a high laser ouput for performing metal machining operations, such as welding or the like, and which can be coupled to a robot or the like.

2. Description of the Related Art

Laser machining requires a machining system which includes a laser oscillator and a robot coupled thereto for achieving its advantages. In order to emit a laser beam from the tip end of the arm of the robot, a reflecting mirror is attached to an articulatory joint of the robot for guiding the laser beam. Rather than the reflecting mirror, an optical fiber may be employed to guide the laser beam.

The reflecting mirror is, however, expensive and very difficult to adjust. A system employing an optical fiber can transmit energy up to several hundred watts at most, and hence, cannot guide energy up to several kilowatts which are needed to effect metal machining operations, such as welding or the like.

SUMMARY OF THE INVENTION

It is an object of the present invention to provide a gas laser device which will solve the above problems, can produce a high laser output for metal machining operation, such as welding or the like, and can be coupled to a robot or the like.

In order to solve the above problems, there is provided according to the present invention a gas laser device in which a laser medium gas is circulated in an airtight container and a laser beam is generated from the gas excited by an electric discharge.

A main unit includes a laser gas oscillation controller, a robot controller, and a discharging power supply. A laser beam emitter, which includes a resonator, is separate from the main unit. The resonator is a lateral multimode resonator, the discharging power supply is a high-frequency power supply, and the resonator has a gas flow which is a lateral or vertical gas flow produced by using a compressor having a high compression ratio. The laser beam emitter is attachable to a distal end of a robot arm or the like.

Since the main unit and the laser beam emitter are separate from each other, the laser beam emitter can easily be attached to the distal end of the robot arm. By using the lateral multimode, the high-frequency power supply, and the lateral gas flow, a high-output laser beam can be generated with a small-size laser beam emitter.

DETAILED DESCRIPTION OF THE PREFERRED EMBODIMENTS

Embodiments of the present invention will hereinafter be described in specific detail with reference to the drawings.

Figure 1:
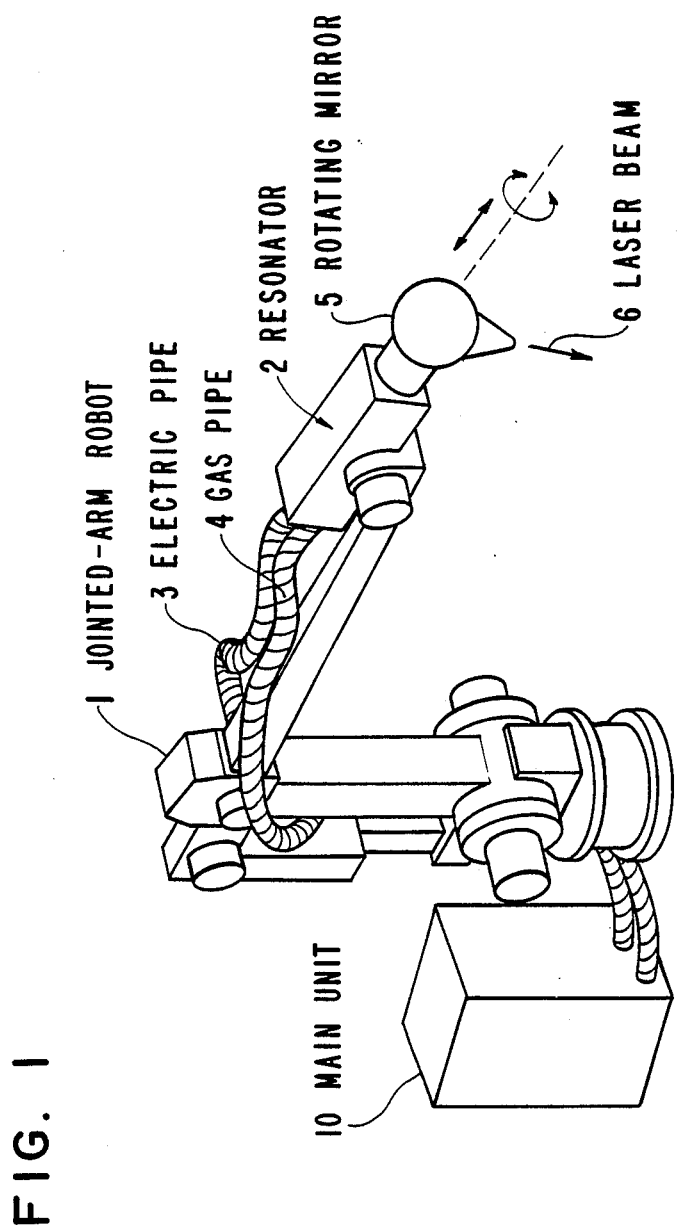
FIG. 1 is a perspective view of an embodiment of the present invention.
Figure 2:
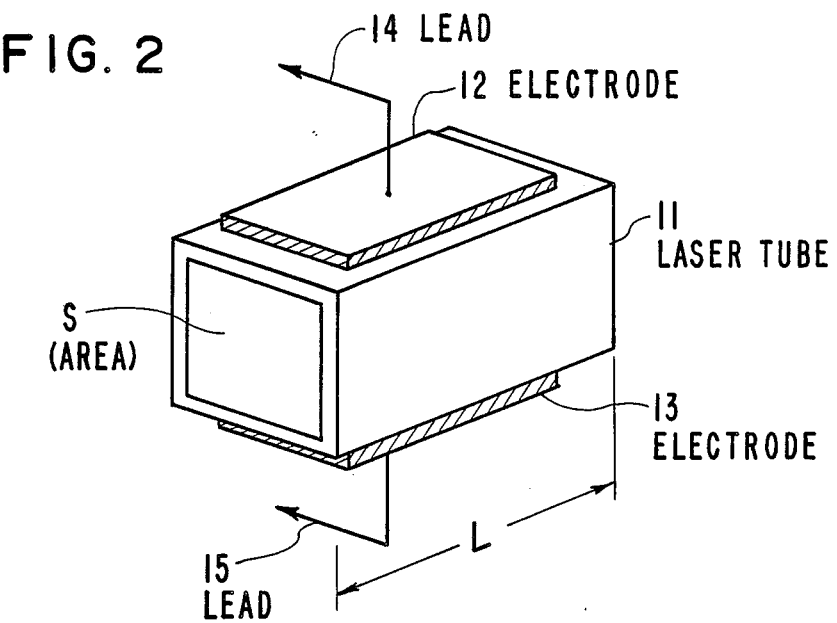
FIG. 2 is a perspective view of a portion of a resonator used in the FIG. 1 embodiment.

Referring to FIGS. 1 and 2 a jointed-arm robot 1 is a widely known ordinary jointed-arm robot. A resonator 2 is high-order lateral multimode resonator. FIG. 2 shows a portion of the resonator 2. A laser tube 11 is made of a dielectric material such as ceramics material and has a rectangular cross section, which is of a square shape in the illustrated embodiment. The reference numerals 12, 13 denote electrodes mounted on outer sides of the laser tube 11. A high-frequency power supply is applied to the electrodes through leads 14, 15. Optical parts such as an output coupling mirror, a reflecting mirror, and the like, and a laser gap passage are omitted from illustration in FIG. 2.

Assuming that the cross-sectional area of the laser tube is represented by S, the length thereof by L, and the output density by $\rho$, the laser output P can be expressed by:

$$P = SL\rho.$$

Unlike the length L, the cross-sectional area S increases in proportion to the square of the length L. Therefore, it is effective to increase the cross-sectional area S. Heretofore, however, if S is large, it has been difficult to achieve uniform discharge excitation, and a lateral multimode results, making beam convergence characteristics poor. As a consequence, this arrangement has not been relied upon. To eliminate the above drawback, a high-frequency power supply, described later, and a lateral gas flow may be employed to reduce the size of the resonator.

The value of $\rho$ when uniform discharge excitation is possible ranges from 2 to 8 W/cc. Therefore, the volume of a resonator having a square-shaped cross section with one side ranging from 5 to 10 cm and a length of 30 cm is in the range of from 750 to 3000 cc, and the laser output P ranges from 1.5 to 24 KW. Welding or the like of metal can be effected at this output level. The resonator of this size can be attached to the distal end of a conventional jointed-arm robot to construct a laser machining system.

With the structure of the laser tube 11 as shown in FIG. 2, if a direct current were supplied, an electric discharge would concentrate on one point, and no uniform electric discharge could be produced in the laser tube 11. By applying a high-frequency power supply in an RF range through the laser tube 11 which is of a dielectric material, according to the preferred embodiment, a uniform electric discharge is produced by a ballast effect due to distributed capacitance. This is because the wall of the laser tube 11 of the dielectric material is divided into a number of sections and serves as an array of capacitors on an XY plane.

An unstable-type resonator may be expected for use as a laser resonator of this type. However, a stable-type resonator is employed in the embodiment. As a result, the lateral mode becomes an extreme multimode.

The small-size laser resonator is made possible by using the high-frequency power supply. Particularly, an RF electric dischare in an RF range is preferred.

A lateral gas flow employing a compressor having a high compression ratio such as a Roots blower is used in order to circulate the laser medium gas in the resonator 2. Since the cross-sectional area of the resonator 2 is large, a lateral gas flow is needed to cool the gas effectively. As the air blower is separate from the resonator 2 and coupled thereto by flexible pipes 4, the air blower such as Roots blower which has a sufficient compression ratio is employed because of the resistance presented by the pipes. The gas flow may also be a vertical gas flow.

Turning referring back to FIG. 1, the reference numeral 3 indicates an electric pipe containing wires from the high-frequency power supply in the main unit 10, and the reference numeral 4 indicates a gas pipe for supplying the laser medium gas from the main unit 10 to the resonator 2.

A rotating mirror 5 converges and changes the direction of the laser beam from the resonator 2. Unlike one used on a joint of a conventional jointed-arm robot, the rotating mirror 5 has a short focal length and is a single mirror. Thus, its adjustments are not difficult to make.

The rotating mirror 5 is movable axially along and rotatable about an axis indicated by the dotted line in FIG. 1. Through movement of the robot arm and movement of the rotating mirror, the laser beam can be applied where necessary to a workpiece.

For laser machining, such as metal welding or the like, a large depth of focus which would be required for metal cutting. Although a very small converging radius is not required, the converging radius may be about 1 mm. The laser beam of a large cross section for metal welding or the like may be converged by an aspherical optical system, such as a parabolic mirror. Those parallel rays which are parallel to the axis of rotation of the parabolic mirror may be converged without aberrations no matter how large the radius may be. The problem is beam divergence due to a beam diverging angle $\theta$. Assuming that the parabolic mirror has a focal length f, the diameter at the focal point is given by $2f\theta$. It has been experimentally confirmed that even in an extreme multimode obtained by the resonator 2, the value of the focus diameter may be about 1 mm.

Figure 3A:
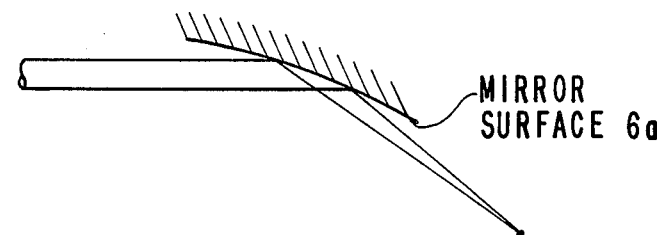
FIGS. 3(a), 3(b), and 3(c) are schematic views of alternative parabolic surfaces used as rotating mirrors.
Figure 3B:
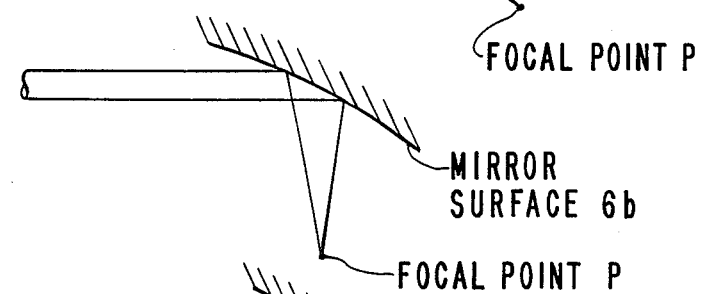
Figure 3C:
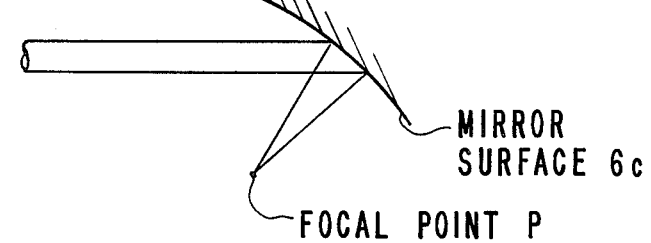

Dependent on the workpiece to be machined, parabolic mirrors as shown in FIGS. 3(a), 3(b), and 3(c) may selectively be used as the rotating mirror 5. In particular, the off-axis parabolic mirror as illustrated in FIG. 3(b) is preferable for machining operation such as welding or the like.

With the small-size, high-output laser resonator 2 being coupled the distal end of the jointed-arm robot 1, a flexible machining system can be constructed. By coupling the rotating mirror to a distal end of the resonator 2, the direction in which the laser beam is emitted is freely controlled for machining, e.g., welding a more complex workpiece.

Denoted at 10 is a main unit containing a robot controller for controlling servomotors for robot arms, and a laser oscillation controller for controlling laser oscillation. The robot controller is an ordinary robot controller.

The laser oscillation controller includes a laser gas controller, a high-frequency power supply, and an output controller. The laser gas controller has an air blower and a heat exchanger for circulating and cooling the laser gas, and also discharges and introduces the gas, controls the gas pressure, and introduces a purging gas.

The high-frequency power supply has a high-frequency power supply unit including an inverter for rectifying and converting a commercial power supply voltage to a high-frequency voltage, a sequence controller for controlling the starting and stopping of oscillation of the high-frequency power supply unit, and a pulse oscillator for controlling the output.

The output controller has an output selector for selecting either a pulse output or a continuous output, and an output control unit for controlling the output under feedback control.

The laser oscillator controller and the robot controller may be separate controllers, but they are housed in one locker to make the device compact according to the embodiment.

In the aforesaid embodiment, a jointed-arm robot is employed. However, robots of other configurations may be selected to meet the desired object. The device may be used to effect operation such as heat treatment of metal or the like.

With the present invention, as described above, a high-output, small-size resonator which is a lateral multimode using a high-frequency power supply is separate from a power supply and an air blower and coupled to the distal end of a robot. Therefore, a flexible laser machining system is provided.

I claim:

1. A gas laser device in which a laser medium gas is circulated in an airtight container and a laser beam is generated from the gas being excited by an electric discharge, the device comprising:
   a multi-articulation robot having an arm;
   a main unit including a laser oscillation controller having a discharging power supply, said main unit being disposed adjacent the multi-articulation robot;
   a laser beam emitter including a resonator and being spaced from the main unit on a distal end of the robot arm; and
   flexible pipes interconnecting the main unit to the laser beam emitter;
   said resonator being a lateral multimode resonator;
   said discharging power supply being a high-frequency power supply; and
   said resonator having a gas flow which is produced by a compressor having a high compression ratio.

2. A gas laser device according to claim 1, wherein said laser beam emitter includes an aspherical, rotatable reflecting mirror.

3. A gas laser device according to claim 2, wherein said reflecting mirror has a parabolic curved surface.

4. A gas laser device according to claim 2, wherein said aspherical reflecting mirror is movable in a direction normal to the direction in which the reflecting mirror is rotatable.

5. A gas laser device according to claim 1, wherein said laser oscillation controller includes a laser gas controller, the high-frequency power supply, and an output controller.

6. A gas laser device according to claim 1, further comprising a robot having a movable arm, and said main unit further comprises a robot controller, said laser beam emitter being attached to a distal end of the movable arm of the robot.

7. A gas laser device according to claim 1, wherein the gas flow of the resonator is a lateral gas flow.

8. A gas laser device according to claim 1, wherein the gas flow of the resonator is a vertical gas flow.

9. A gas laser device according to claim 1, wherein the frequency of the high-frequency power supply is in the radio frequency range.

10. A gas laser device in which a laser medium gas is circulated in an airtight container and a laser beam is generated from the gas being excited by an electric discharge, the device comprising:
- a multi-articulation robot having a movable arm;
- a main unit including a robot controller and a laser oscillation controller having a high frequency discharging power supply, said main unit being disposed adjacent the multi-articulation robot;
- a resonator having a lateral gas flow for cooling the laser medium gas and being disposed on a distal end of the robot arm;
- flexible pipes interconnecting the main unit to the laser beam emitter;
- a high compression air blower in fluid communication with the resonator for circulating the laser medium gas in the resonator; and
- an aspherical reflecting mirror coupled to the resonator for emitting a laser beam in a controllable direction.

11. A gas laser device according to claim 9, wherein said resonator is a lateral multimode resonator.

12. A gas laser device according to claim 10, wherein said high-frequency power supply has a frequency in the radio frequency range.

13. A gas laser device according to claim 1, wherein the high-frequency discharging power supply is in the radio frequency range.

14. A gas laser device according to claim 10, wherein the high-frequency discharging power supply is in the radio frequency range.

15. A gas laser device coupled to a multi-articulation robot provided with an arm driven by a servo motor, comprising:
- a laser oscillation control means for controlling a laser oscillation state comprising laser gas control means for circulating a laser medium gas by a compressor having a high compression ratio, high-frequency power supply means for supplying high-frequency power to effect an electric discharge of the laser medium gas, and output control means for outputting a laser beam output control signal;
- laser beam emitting means attached to the distal end of the arm of said multi-articulation robot for circulating said laser medium gas to a laser resonator in an airtight container and generating a laser beam from said laser medium gas excited by the electric discharge;
- a gas piping disposed along the arm of said multi-articulation robot for supplying said laser medium gas of said laser oscillation control means to said laser beam emitting means; and
- an electric piping disposed along the arm of said multi-articulation robot for housing cables for supplying said high-frequency power and said laser beam output control signal of said laser oscillation control means to said laser beam emitting means.

16. A gas laser device according to claim 15, wherein said laser resonator has a volume ranging from 750 cc to 3000 cc.

* * * * *

UNITED STATES PATENT AND TRADEMARK OFFICE
CERTIFICATE OF CORRECTION

PATENT NO. : 4,866,238

DATED : September 12, 1989

INVENTOR(S) : Karube

It is certified that error appears in the above-identified patent and that said Letters Patent is hereby corrected as shown below:

Col. 3, Line 10, "Turning referring" should be --Referring--.

Col. 3, Line 49, after "coupled" insert --to--.

Signed and Sealed this

Twenty-fifth Day of December, 1990

Attest:

HARRY F. MANBECK, JR.

*Attesting Officer*  *Commissioner of Patents and Trademarks*